July 26, 1932. H. FELDMEIER 1,868,698
HEAT EXCHANGE DEVICE
Filed Sept. 16, 1930  3 Sheets-Sheet 1
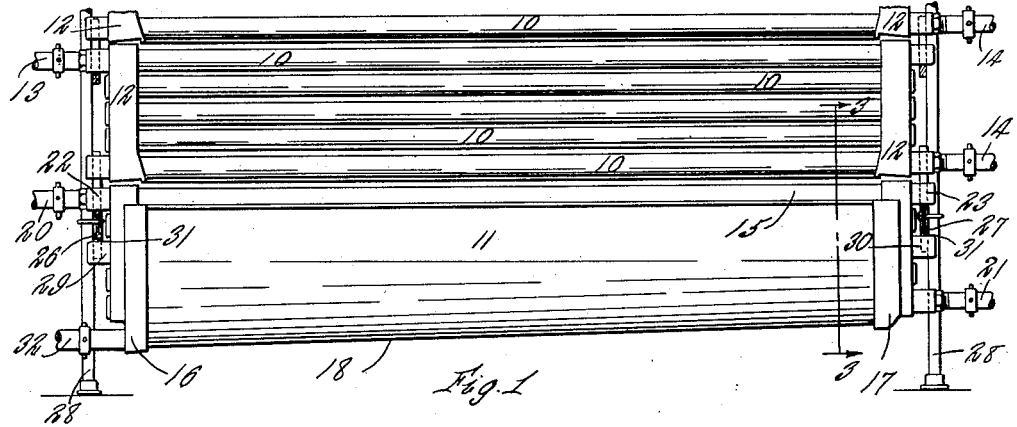
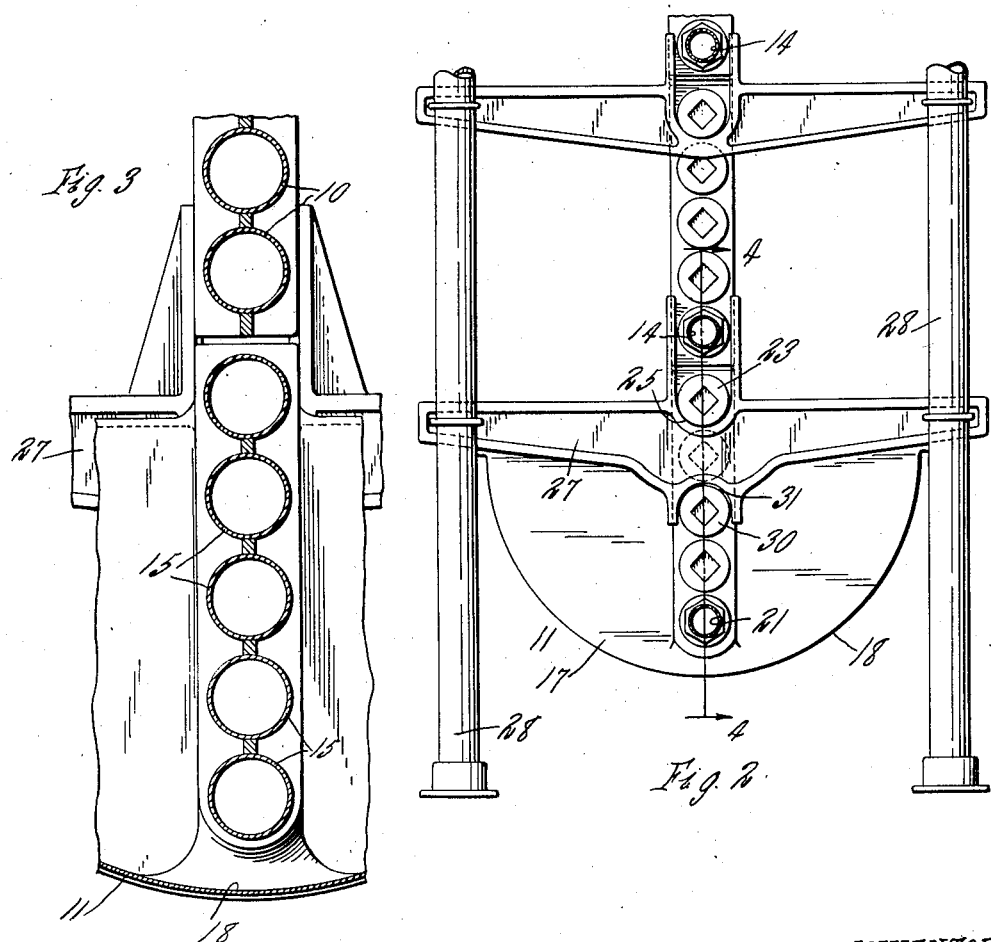
INVENTOR
Harvey Feldmeier
by Parker & Puchnow
ATTORNEYS July 26, 1932.  H. FELDMEIER  1,868,698

HEAT EXCHANGE DEVICE

Filed Sept. 16, 1930  3 Sheets-Sheet 2

INVENTOR
Harvey Feldmeier
by Parker & Prochnow
ATTORNEYS

July 26, 1932. H. FELDMEIER 1,868,698
HEAT EXCHANGE DEVICE
Filed Sept. 16, 1930 3 Sheets-Sheet 3
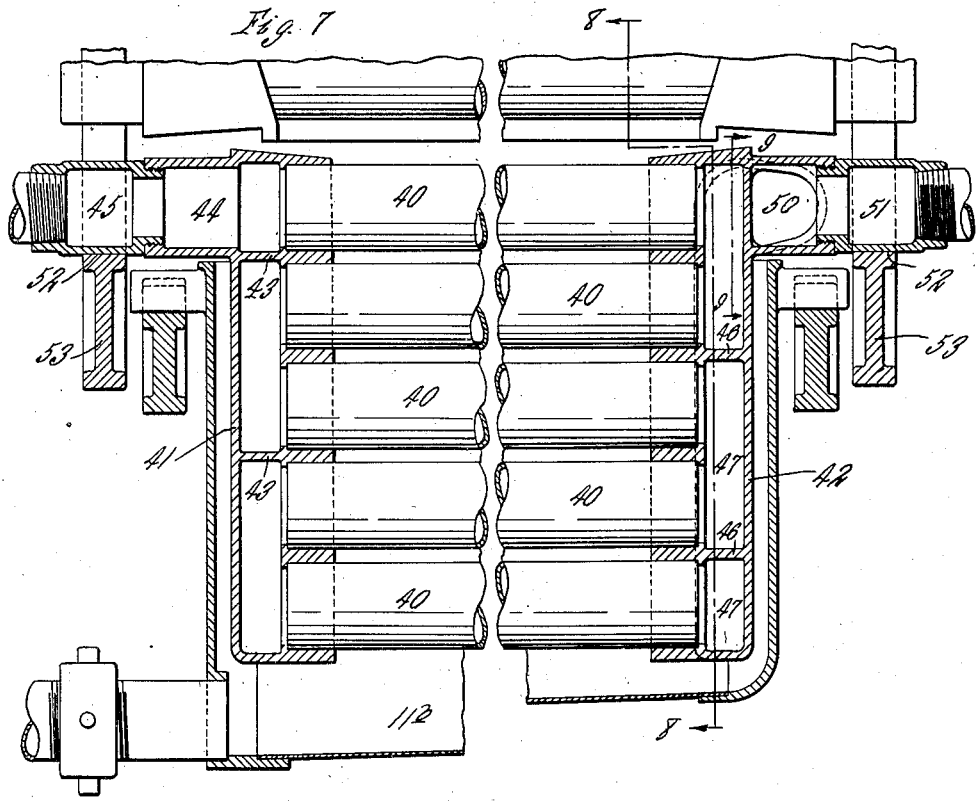
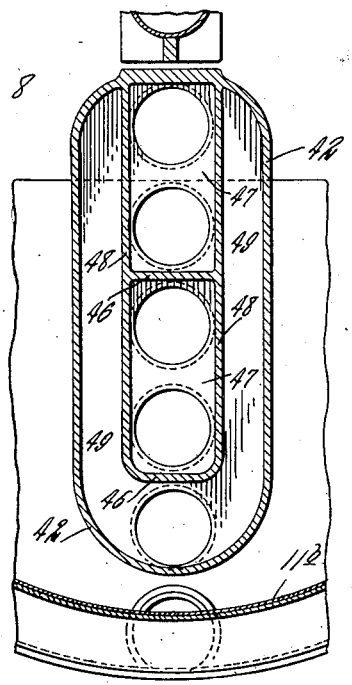
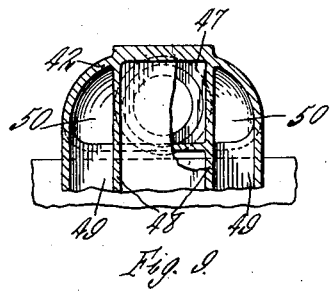
INVENTOR
Harvey Feldmeier
by Parker Prochnow
ATTORNEYS Patented July 26, 1932

1,868,698

UNITED STATES PATENT OFFICE

HARVEY FELDMEIER, OF LITTLE FALLS, NEW YORK, ASSIGNOR TO CHERRY-BURRELL CORPORATION, OF WILMINGTON, DELAWARE, A CORPORATION OF DELAWARE

HEAT EXCHANGE DEVICE

Application filed September 16, 1930. Serial No. 482,173.

This invention relates to improvements in heat exchange devices, and more particularly to surface liquid coolers and heaters in which a liquid, such for example as milk, flows in thin films over the external surface of a heat exchange element so as to effect an exchange of heat between such liquid and another circulating medium. In surface milk coolers and heaters of this type as heretofore ordinarily constructed, the milk is delivered upon the topmost tube of a vertical stack of superposed horizontal tubes, and after flowing down over the successive tubes, falls from the lowermost tube into a receiver or trough which is arranged below the stack of tubes, and from which the cooled or heated milk discharges through the usual pipe or pump connection.

In the use of such surface milk coolers and heaters it has been found that the agitation of the milk, due to its fall from the bottom tube into the trough, at times seriously affects the cream line of the milk. It is therefore desirable to reduce to the minimum the distance which the milk falls from the tubes into the trough. Unless provision is made for maintaining the milk which collects in the bottom trough at the temperature at which it leaves the heat exchange tubes, there may be an objectionable rise or fall in the temperature of the milk in the trough, so that it is also desirable to provide means for insuring the desired temperature of the milk in the trough or maintaining it at the temperature at which it leaves the lowermost tube of the heat exchange stack.

One object of the invention is to provide efficient means of simple and practical construction which will overcome the objections and give the improved results above indicated.

Other objects of the invention are to provide a surface heat exchange device of the type mentioned with a bottom receiver or trough having a supplemental element or series of tubes within the receiver onto which the milk flows from the main coil or element above, and which will maintain the milk in the bottom receiver at a desired temperature and will also eliminate or reduce to the minimum the fall and agitation of the milk in the trough; also to accomplish these results by a construction which avoids the presence in the trough of any joints, packings or parts which could result in contamination of the milk by the cooling or heating medium or by contact of such parts with the milk; also to provide a heat exchange device of the type mentioned in which a supplemental coil or element is provided in the bottom receiver for continuing the temperature changing action of the main element or stack of tubes above the receiver, thereby increasing the capacity of the device without increasing its height; and also to provide a heat exchange device of the type mentioned having the other features of improvement and advantage hereinafter described and set forth.

In the accompanying drawings:

Fig. 1 is a fragmentary side elevation of a tubular surface heat exchange device of one form embodying the invention.

Fig. 2 is an end elevation on an enlarged scale thereof.

Fig. 3 is a transverse, sectional elevation thereof on line 3—3, Fig. 1.

Fig. 7 is a longitudinal, sectional elevation of another modification of the invention.

Fig. 8 is a transverse, sectional elevation thereof on line 8—8, Fig. 7.

Fig. 9 is a fragmentary, transverse, sectional elevation on line 9—9, Fig. 7.

Figure 4:
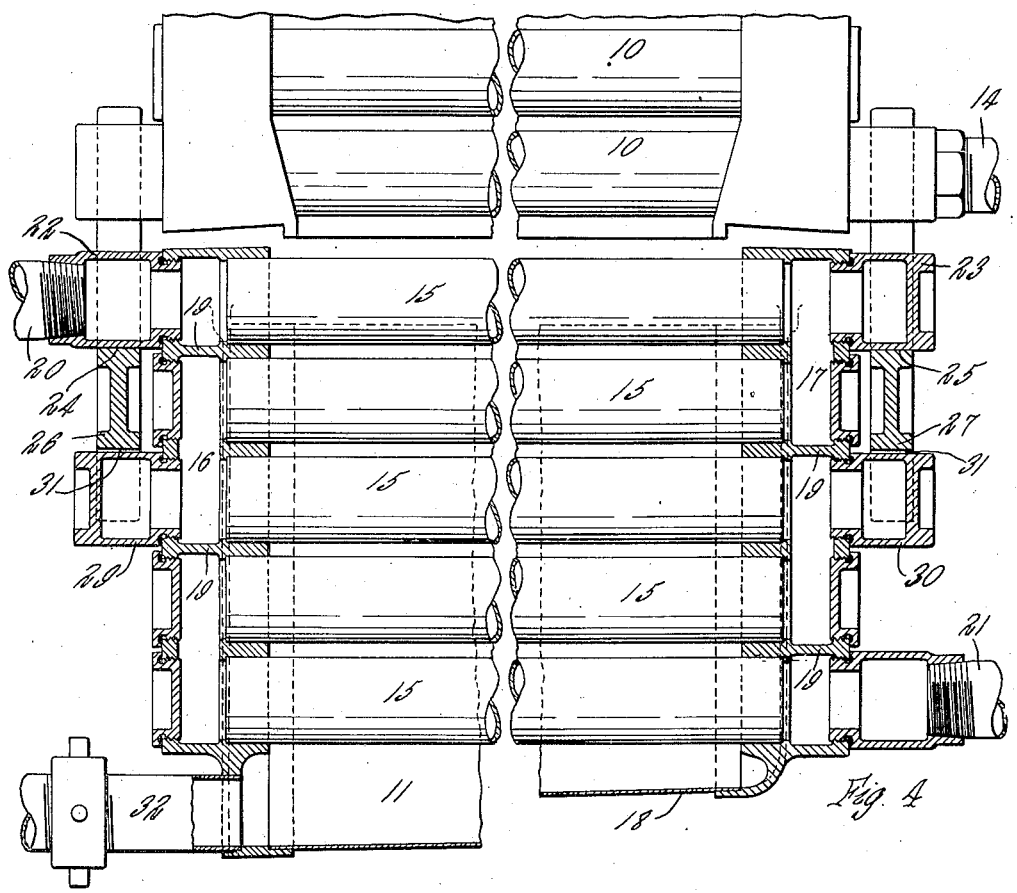
Fig. 4 is a longitudinal, sectional elevation on an enlarged scale on line 4—4, Fig. 2.

Describing first the construction shown in Figs. 1 to 4, 10 represents the horizontal tubes of a surface milk cooler or heater of known construction, and 11 represents the bottom trough or receiver arranged below the stack of tubes 10 so as to receive the milk flowing down over the surfaces of the tubes 10.

A sectional stack is illustrated, comprising superimposed sections, each consisting of several tubes 10 arranged horizontally one above another in the same vertical plane and connected at their ends to headers 12 which join the tubes in a well known manner, so that water, brine or other medium supplied to one header or tube, for instance, to the top tube of the section by a supply pipe 13, will circulate through the several tubes and discharge therefrom through an outlet pipe 14 connected to one end of the lowermost tube of the section. Water and brine or other mediums of different temperatures may be supplied to the different sections so as to produce a progressive cooling or heating of the milk. Only the bottom section and the bottom tube of the next section above are shown in the drawings. The device can be either of this sectional type or all of the tubes can be joined in a single unit, as preferred, or the heat exchange element can be of other construction.

Arranged within the bottom trough or receiver 11 is a supplemental heat exchange element or group of connected tubes which are adapted to be more or less submerged in the milk in this trough or receiver. This supplemental coil or element is arranged in the same vertical plane with and beneath the main element or stack of tubes 10, with the top tube of the supplemental coil directly beneath and close to the bottom tube 10 of the main coil or element so that the milk will flow gently off of the bottom tube 10 of the main coil onto the top tube of the supplemental coil and can similarly flow in succession from one to the other of the tubes of the supplemental coil in the bottom trough or receiver 11.

In the construction shown in Figs. 1 to 4 the bottom trough 11 is provided with hollow opposite ends 16 and 17 to which the tubes 15 of the supplemental coil are connected at their ends and which form headers or connections for joining the tubes 15 end to end to form the coil. These headers 16 and 17 are connected by a curved plate 18 which is soldered, brazed or otherwise permanently secured to headers 16 and 17 and together therewith form the bottom trough. The tubes 15 are soldered or brazed in holes in the inner walls of the headers 16 and 17 or are otherwise suitably joined to the headers, and the headers, as usual, may be provided with cross partitions or walls 19 dividing the headers into passages which connect the several tubes 15 end to end in series so as to form a continuous passage. Water, brine or other medium admitted to one of the tubes 15, for example the top tube 15, by a supply pipe 20 connected to one header 16, will circulate through the several tubes in succession and discharge from the bottom 15 through an outlet or discharge pipe 21 connected to the header 17. The supply or discharge pipes 20 and 21 will be connected with the same header or with the opposite headers 16 and 17, depending upon whether an even or odd number of the tubes 15 is used.

The milk flows over the surfaces of the tubes 15 and contacts with the headers or ends 16 and 17 of the trough, and in the use of the device these parts may be more or less submerged in the milk in the trough. It is therefore important that the joints between the tubes and the headers 16 and 17 should be of a construction which cannot leak and will not deleteriously affect the milk by contact therewith or form crevices in which the milk can lodge and which cannot be readily cleaned and kept sanitary. The tubes are therefore preferably soldered or brazed to the headers so as to form smooth, permanent joints between the parts.

In order to insure that the tubes 15 of the supplemental coil will be disposed directly beneath or in the same vertical plane as the tubes of the main stack, the supplemental coil is preferably provided at its opposite ends with projecting studs or parts which are seated in guides in the supporting frame or rack of the device. In the construction shown, screw studs 22 and 23 are screwed into threaded holes in the outer walls of the headers or trough ends 16 and 17, and rest in central, vertical guides or seats 24 and 25 in cross bars 26 and 27 of the supporting frame or rack 28 of the device. The stud 22 is hollow and the supply pipe 20 for the heating or cooling medium is connected to the outer end of this stud, which thus forms a union or fluid connection between the pipe and the header 16. The two trough ends 16 and 17 are also preferably provided with additional studs 29 and 30 screwed into cleanout holes in the outer walls of the trough ends and projecting into guide slots 31 in the bottoms of the cross bars 26 and 27, thereby holding the trough and the supplemental coil stationarily in the vertical plane of the main stack.

In the use of the heat exchange device described, the milk flowing down over the outer surfaces of the tubes 10 of the main stack flows off of the bottom tube thereof onto the top tube of the supplemental coil, which is located close to the bottom tube 10, and over the surfaces of some or all of the tubes 15 of the supplemental coil, depending upon whether or not the tubes 15 are submerged in the milk in the trough, finally flowing off of the supplemental coil into the trough from which the milk may discharge through a suitable outlet pipe 32. Since the supplemental coil will be more or less submerged in the milk in the trough, depending upon the level to which the milk rises in the trough, the milk will flow gently without substantial fall or splashing from the supplemental coil into the trough and, therefore, there will be no objectionable agitation of the milk in the trough.

Figure 5:
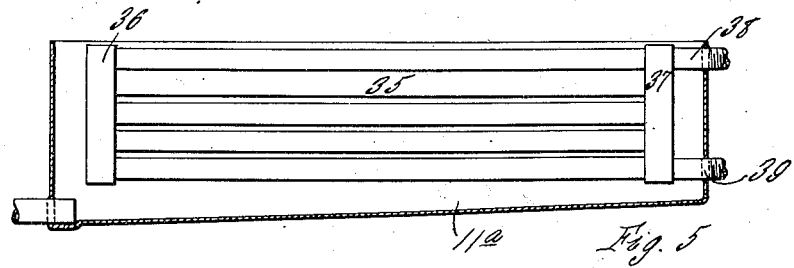
Figs. 5 and 6 are sectional elevations showing two modified constructions of the bottom trough or receiver and heat exchange element embodying the invention.

In the modified construction shown in Fig. 5, the supplemental or submerged coil or element 35 is complete independently of and disposed within the bottom trough or receiver 11a, the coil 35 being composed of parallel, horizontal tubes arranged one above the other and connected at their opposite ends to headers 36 and 37 which join the tubes so as to permit the circulation of a medium through the tubes, a cooling or heating medium being supplied to and discharged from the supplemental coil, as by supply and discharge pipes 38 and 39 connected to the header 37. These supply and discharge pipes 38 and 39 pass through holes in one end of the trough 11a. The supplemental coil 35 is centrally supported in the trough in the vertical plane of the tubes of the main stack, as by the supply pipes 38 and 39, supplemented, if necessary, by any other suitable supporting means. In this construction the tubes of the supplemental coil and the supply and discharge pipes are soldered or brazed to the headers or are joined thereto by other suitable joints which cannot leak or objectionably affect the milk by contact therewith, and the supply pipes 38 and 39 are likewise soldered or brazed or otherwise suitably secured in the holes in the end of the trough 11a through which these pipes extend.

Figure 6:
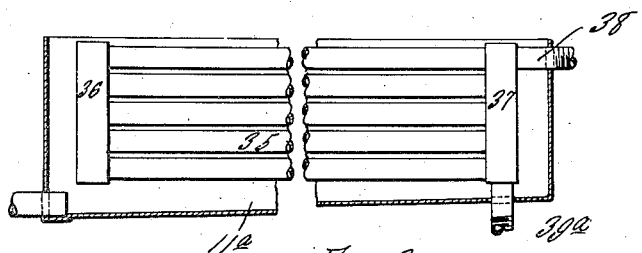

The construction shown in Fig. 6 is similar to that shown in Fig. 5 just described, except that the discharge pipe 39a extends from the header 37 through a hole in the bottom of the trough instead of through the end of the trough.

Figs. 7 to 9 illustrate another modification of the invention, in which a supplemental or submerged coil or element is provided which is separate from and depends into the bottom trough or receiver 11b and is provided with supply and discharge connections for the medium that circulates through the coil arranged to extend out over the walls of the trough so that this supplemental coil is entirely independent of and can be readily placed into and removed from the trough. In this construction the supplemental element is formed by superposed horizontal tubes 40 connected at their opposite ends to headers 41 and 42 constructed so as to join the tubes 40 end to end in series. One of these headers, for example 41, may be of ordinary construction, having partitions 43 forming passages which connect the adjacent ends of the tubes in pairs, and this header is provided at its upper end with an outwardly projecting tubular part 44 to which the supply pipe 45 is joined. The opposite header 42 is similarly provided with partitions 46 forming passages 47 in this header which connect adjacent ends of the tubes in pairs, but in addition, this header is provided with partitions 48 which form in the header at opposite sides of the passages 47, upright passages 49 which connect the lowermost passage 47 with which the bottom tube 40 connects, to a discharge passage 50 at the top of the header. With the last-named passage 50, the discharge pipe 51 connects. By this construction the cooling or heating medium entering the header 41 through the top connection 44 will flow through the top tube 40, thence back through the next lower tube and so on through the several tubes into the passage 47 in the bottom of the header 42, and from this passage the cooling or heating medium will flow upwardly through the upright passage 49 in the header 42 at opposite sides of the return passages 47 for the tubes, and through the discharge passage 50 at the top of the header to the discharge pipe 51. As explained in connection with the previously described constructions, the tubes 40 are soldered or otherwise joined to the headers 41 and 42 in such a manner that the joints cannot leak and the milk will not be deleteriously affected by contact with the parts of the supplemental or submerged coil.

By this last described construction the coil is entirely independent of and removable from the bottom trough or receiver, but nevertheless there are no pipe connections, joints or other parts contacting with the milk in the trough which can objectionably affect the milk. The supplemental or submerged coil in this construction can be supported in the trough beneath and in vertical plane of the main stack by suitable means such as by seating the supply and discharge pipes or connections 45 and 51, in guides or seats 52 in the cross bars or parts 53 of the supporting frame or rack for the main stack.

In all of the embodiments of the invention herein described, a supplemental coil or element is disposed within the bottom receiver or trough, directly beneath the bottom of the main coil or element, so that the milk can flow off of the bottom of the main coil onto the supplemental coil and flow gently off of the latter without or substantially without fall or splashing into the bottom receiver. Furthermore, this coil provides means for supplementing the heat exchange action of the main coil or ensuring a desired temperature of the milk collecting in the receiver.

It gives several additional heat exchange tubes without addition to the height of the cooler, since the supplemental coil is disposed in the bottom trough beneath the regular coil which is located at the usual elevation over the trough, and it should not add to the cost of the device for the same total number of tubes. Surface heat exchangers of this type are commonly enclosed, and in such case the supplemental submerged coil reduces the height, weight and cost of the side covers for exchangers of a given number of tubes because only the tubes above the trough have to be protected by the covers.

The trough having the submerged coil therein can be used in place of the ordinary trough in existing coolers and heaters, or the separate supplemental coil or element shown in Figs. 7 to 9 can be used in the regular trough of existing coolers and heaters.

I claim as my invention:

1. The combination with a main heat exchange element over which a liquid is adapted to flow in heat exchange relation to another medium, and a receiver below said element for receiving said liquid, of a supplemental heat exchange element arranged beneath said main element and comprising a plurality of tubes located within said receiver and connected to cause a heat exchange medium to flow through said tubes in succession and over which the liquid flows from said main element into the receiver, said supplemental element having no separable parts within said receiver.

2. The combination with a main heat exchange element over which a liquid is adapted to flow in heat exchange relation to another medium, and a receiver below said element for receiving said liquid, of a supplemental heat exchange element arranged beneath said main element and comprising a plurality of tubes located within said receiver and connected to cause a heat exchange medium to flow through said tubes in succession and over which the liquid flows from said main element into the receiver, and fluid supply and discharge connections for said supplemental element coupled thereto externally of said receiver.

3. The combination with a hollow main heat exchange element over which a liquid is adapted to flow externally in heat exchange relation to a medium circulating within the element, and a receiver below said element for receiving said liquid, of a supplemental heat exchange element arranged beneath said main element and comprising a plurality of tubes located within said receiver and connected to cause a heat exchange medium to flow through said tubes in succession and over which the liquid flows from said main element into the receiver, said supplemental element having only permanent joints between the parts thereof which are disposed within said receiver.

4. The combination with a main coil comprising superposed tubes over which a liquid is adapted to flow externally in heat exchange relation to a medium circulating through said coil, and a receiver below said coil for receiving said liquid, of a supplemental coil arranged beneath said main coil and comprising a plurality of tubes located within said receiver and connected to cause a heat exchange medium to flow through said tubes in succession and over which the liquid flows from said main coil into the receiver, and fluid supply and discharge connections for said supplemental coil coupled thereto externally of said receiver.

5. The combination with a main heat exchange element over which a liquid is adapted to flow in heat exchange relation to another medium, and a receiver below said element for receiving said liquid, said receiver having hollow ends, tubes arranged beneath said main element within said receiver and joined by said hollow receiver ends for the circulation of a medium through said tubes, and supply and discharge connections for said medium coupled to said hollow receiver ends.

6. The combination with a main heat exchange element over which a liquid is adapted to flow in heat exchange relation to another medium, and a receiver below said element for receiving said liquid, tubes arranged in the receiver beneath said main element, said receiver having passages formed therein which join said tubes for the circulation of a medium through the tubes, and supply and discharge connections for said medium connecting with said passages.

7. A combined receiving trough and heat exchange device for liquids comprising opposite hollow ends, a wall connecting said ends and together therewith forming a trough, tubes extending lengthwise within said trough and being joined by said hollow trough ends for the circulation of a medium through said tubes, and supply and discharge connections for said medium coupled to said hollow ends.

8. The combination with a main heat exchange element over which a liquid is adapted to flow in heat exchange relation to another medium, and a receiver below said element for receiving said liquid, of a supplemental heat exchange element arranged beneath said main element at least partially within said receiver and over which the liquid flows from said main element into the receiver, said supplemental element having permanently attached portions extending outwardly therefrom over the walls of said receiver for connection with supply and discharge pipes for said medium.

9. The combination with a main heat exchange element over which a liquid is adapted to flow in heat exchange relation to another medium, and a receiver below said element for receiving said liquid, of a supplemental heat exchange element removably supported beneath said main element and extending into said receiver so that the liquid will flow from said main element onto said supplemental element, said supplemental element comprising a plurality of tubes located within said receiver and connected to cause a heat exchange medium to flow through said tubes in succession and having only permanent joints between the parts thereof which are disposed within said receiver.

10. The combination with a main heat exchange element over which a liquid is adapted to flow in heat exchange relation to another medium, and a receiver below said element for receiving said liquid, of a supplemental heat exchange element removably supported beneath said main element and extending into said receiver so that the liquid will flow from said main element onto said supplemental element, said supplemental element having supporting portions extending outside of said receiver, and supply and discharge pipes for said medium coupled to said supporting portions.

HARVEY FELDMEIER.